US012625024B2

(12) United States Patent
Cegnar

(10) Patent No.: US 12,625,024 B2
(45) Date of Patent: May 12, 2026

(54) PRESSURIZED AIR APPARATUSES AND ASSOCIATED PROCESSING CIRCUITRY

(71) Applicant: Boonie Labs LLC, Moscow, ID (US)

(72) Inventor: Erik J. Cegnar, Moscow, ID (US)

(73) Assignee: Boonie Labs LLC, Moscow, ID (US)

( * ) Notice: Subject to any disclaimer, the term of this patent is extended or adjusted under 35 U.S.C. 154(b) by 229 days.

(21) Appl. No.: 18/277,557

(22) PCT Filed: Feb. 17, 2022

(86) PCT No.: PCT/US2022/016849
§ 371 (c)(1),
(2) Date: Aug. 16, 2023

(87) PCT Pub. No.: WO2022/182572
PCT Pub. Date: Sep. 1, 2022

(65) Prior Publication Data
US 2024/0230445 A1 Jul. 11, 2024

Related U.S. Application Data

(60) Provisional application No. 63/152,455, filed on Feb. 23, 2021.

(51) Int. Cl.
*G01L 19/08* (2006.01)
*B63B 7/08* (2020.01)
(52) U.S. Cl.
CPC .............. *G01L 19/083* (2013.01); *B63B 7/08* (2013.01)
(58) Field of Classification Search
CPC . G01L 19/147; G01L 9/0072; G01L 19/0645; G01L 19/0084; G01L 13/025;
(Continued)

(56) References Cited

U.S. PATENT DOCUMENTS

| | | |
|---|---|---|
| D248,404 S | 7/1978 | Henry |
| 4,478,587 A | 10/1984 | Mackal |
| | (Continued) | |

FOREIGN PATENT DOCUMENTS

WO                WO        8/2023
PCT/US2022/016849

OTHER PUBLICATIONS

Cegnar et al., U.S. Appl. No. 62/612,468, filed Dec. 31, 2017, titled "Attachable Inflatable Craft Pressure Gauge", 14 pages.
(Continued)

*Primary Examiner* — Andre J Allen
(74) *Attorney, Agent, or Firm* — Wells St. John P.S.

(57) ABSTRACT

Pressurized air apparatuses and associated methods are described. According to one aspect, a pressurized air apparatus includes an air input configured to receive pressurized air, a pressure sensor configured to receive the pressurized air from the air input, measure a plurality of different pressures of the pressurized air at a plurality of moments in time, and generate a plurality of signals that are indicative of the different pressures of the pressurized air, processing circuitry configured to receive the signals from the pressure sensor, and process the signals to select one of the signals and disregard others of the signals, and a user interface configured to communicate a value indicative of the pressure of the pressurized air that corresponds to the selected one of the signals to an operator of the pressurized air apparatus.

22 Claims, 10 Drawing Sheets

(58) Field of Classification Search
CPC .............. G01L 19/0007; G01L 9/0042; G01L
19/0038; G01L 9/0073; G01L 9/0075;
G01L 9/0054; G01L 9/0055; G01L 19/04;
G01L 7/00; G01L 7/04; G01L 19/148;
G01L 19/14; G01L 19/143; G01L 17/00;
G01L 7/18; G01L 19/0092; G01L 15/00;
G01L 9/0051; G01L 7/041; G01L 9/12;
G01L 9/065; G01L 19/0618; G01L
9/0052; G01L 9/125; G01L 7/16; G01L
19/0609; G01L 19/003; G01L 9/007;
G01L 19/0627; G01L 19/0046; G01L
9/0022; G01L 9/06; G01L 19/0636; G01L
7/084; G01L 13/02; G01L 19/0023; G01L
19/142; G01L 7/043; G01L 19/08; G01L
9/0002; G01L 19/02; G01L 9/008; G01L
19/141; G01L 9/006; G01L 11/02; G01L
19/0672; G01L 23/10; G01L 23/18; G01L
19/068; G01L 19/0077; G01L 19/12;
G01L 27/005; G01L 7/082; G01L 9/0044;
G01L 19/0015; G01L 19/0069; G01L
7/063; G01L 9/0001; G01L 19/146; G01L
21/12; G01L 27/002; G01L 27/007; G01L
9/16; G01L 11/00; G01L 19/00; G01L
9/0026; G01L 9/0089; G01L 9/045; G01L
9/14; G01L 19/0654; G01L 1/2281; G01L
11/025; G01L 13/026; G01L 11/008;
G01L 7/22; G01L 13/00; G01L 9/0047;
G01L 7/08; G01L 9/0076; G01L 9/0025;
G01L 9/0035; G01L 19/0061; G01L
9/0005; G01L 9/0041; G01L 9/0019;
G01L 9/08; G01L 9/10; G01L 21/00;
G01L 9/04; G01L 11/006; G01L 19/086;
G01L 9/00; G01L 9/0008; G01L 1/18;
G01L 11/004; G01L 19/069; G01L
9/0057; G01L 19/083; G01L 19/06; G01L
19/10; G01L 19/16; G01L 9/0016; G01L
13/023; G01L 7/048; G01L 9/0048; G01L
9/0027; G01L 9/0086; G01L 9/0079;
G01L 11/04; G01L 1/20; G01L 9/0091;
G01L 27/00; G01L 11/002; G01L 23/24;
G01L 7/182; G01L 1/02; G01L 19/0663;
G01L 7/166; G01L 23/22; G01L 9/0036;
G01L 9/0061; G01L 9/0039; G01L
23/125; G01L 19/145; G01L 9/0013;
G01L 21/04; G01L 9/0045; G01L 9/0092;
G01L 1/142; G01L 7/104; G01L 9/0033;
G01L 9/0083; G01L 9/0098; G01L
1/2293; G01L 7/24; G01L 9/02; G01L
21/22; G01L 9/0029; G01L 7/022; G01L
1/205; G01L 9/0064; G01L 23/08; G01L
5/14; G01L 13/06; G01L 23/16; G01L
7/088; G01L 7/163; G01L 9/0007; G01L
23/222; G01L 1/16; G01L 1/2287; G01L
9/0085; G01L 9/025; G01L 1/2212; G01L
21/14; G01L 9/0004; G01L 23/02; G01L
9/003; G01L 9/085; G01L 1/14; G01L
1/148; G01L 9/0058; G01L 9/105; G01L
7/02; G01L 7/061; G01L 9/002; G01L
1/2231; G01L 13/028; G01L 9/0095;
G01L 23/28; G01L 1/162; G01L 19/0076;
G01L 7/12; G01L 9/0038; G01L 9/0032;
G01L 21/10; G01L 7/024; G01L 19/149;
G01L 1/246; G01L 7/086; G01L 1/005;
G01L 5/228; G01L 7/06; G01L 1/2206;
G01L 7/102; G01L 13/021; G01L 27/02;
G01L 1/2262; G01L 1/24; G01L 1/26;
G01L 23/00; G01L 9/0094; G01L 19/144;
G01L 9/0082; G01L 1/125; G01L 9/0097;
G01L 1/226; G01L 11/06; G01L 21/30;
G01L 21/34; G01L 23/221; G01L 7/187;
G01L 7/20; G01L 1/146; G01L 23/26;
G01L 7/068; G01L 1/144; G01L 1/225;
G01L 23/32; G01L 7/14; G01L 1/165;
G01L 23/12; G01L 1/241; G01L 13/04;
G01L 7/045; G01L 1/086; G01L 1/22;
G01L 7/108; G01L 9/18; G01L 1/127;
G01L 17/005; G01L 5/18; G01L 1/245;
G01L 21/32; G01L 1/183; G01L 1/2218;
G01L 9/0023; G01L 1/243; G01L 23/145;
G01L 5/0047; G01L 5/0076; G01L
9/0088; G01L 1/106; G01L 1/10; G01L
9/001; G01L 1/186; G01L 23/223; G01L
25/00; G01L 5/165; G01L 5/226; G01L
9/0017; G01L 1/044; G01L 3/245; G01L
9/005; G01L 1/08; G01L 21/16; G01L
3/1485; G01L 5/0038; G01L 5/162; G01L
5/225; G01L 7/026; G01L 7/065; G01L
9/0014; G01L 1/04; G01L 1/242; G01L
21/24; G01L 3/10; G01L 5/0004; G01L
5/0052; G01L 5/24; G01L 7/10; G01L
1/00; G01L 1/103; G01L 1/2275; G01L
1/247; G01L 21/02; G01L 21/26; G01L
23/225; G01L 3/102; G01L 3/105; G01L
5/223; G01L 7/028; G01L 9/0011; G01L
5/00; G01L 5/0028; G01L 5/243; G01L
1/083; G01L 1/12; G01L 21/36; G01L
23/04; G01L 23/14; G01L 23/30; G01L
3/103; G01L 5/0033; G01L 5/102; G01L
5/133; G01L 5/1627; G01L 5/166; G01L
7/185; G01L 1/255; G01L 21/08; G01L
5/0057; G01L 5/22; G01L 1/042; G01L
1/122; G01L 1/2225; G01L 1/2243; G01L
1/2256; G01L 1/248; G01L 2009/0067;
G01L 2009/0069; G01L 21/06; G01L
23/06; G01L 3/00; G01L 3/06; G01L
3/1478; G01L 3/1492; G01L 3/18; G01L
3/24; G01L 3/242; G01L 5/0061; G01L
5/08; G01L 5/10; G01L 5/101; G01L
5/108; G01L 5/16; G01L 5/161; G01L
5/167; G01L 5/28; G01L 1/046; G01L
2009/0066; G01L 2019/0053; G01L
23/085; G01L 23/20; G01L 5/0071; G01L
5/008; G01L 5/06; G01L 5/171; G01L
7/106; B63B 22/20; B63B 27/24; B63B
39/12; B63B 7/08; B63B 7/085; B63B
71/00; G01M 17/02; G01M 17/022;
G01M 17/027; G01M 17/021; G01M
17/024; G01M 17/025; G01M 17/013;
G01M 17/007; G01M 1/045; G01M
17/06; G01M 1/326; G01M 1/02; G01M
1/30; G01M 17/0074; G01M 5/0058;
G01M 1/26; G01M 17/04; G01M 1/225;
G01M 17/065; G01M 17/0072; G01M
17/10; G01M 7/00; G01M 1/16; G01M
99/00; G01M 1/34; G01M 7/08; G01M
17/028; G01M 17/045; G01M 3/3218;
G01M 3/40; G01M 1/04; G01M 17/08;
G01M 17/03; G01M 5/0091; G01M
1/365; G01M 13/04; G01M 5/0066;

G01M 1/08; G01M 1/22; G01M 13/027; G01M 17/00; G01M 5/0033; G01M 1/00; G01M 15/044; G01M 3/24; G01M 3/2876; G01M 5/0075; G01M 1/06; G01M 1/12; G01M 1/122; G01M 1/24; G01M 1/32; G01M 1/36; G01M 11/081; G01M 13/023; G01M 13/025; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 1/14; G01M 1/28; G01M 3/002; G01M 3/04; G01M 7/02; G01M 9/06; B60C 23/0408; B60C 23/0496; B60C 23/061; B60C 23/0494; B60C 23/0416; B60C 23/0433; B60C 23/0493; B60C 19/00; B60C 23/04; B60C 23/0462; B60C 23/041; B60C 23/20; B60C 23/0411; B60C 23/0479; B60C 23/0444; B60C 11/246; B60C 23/064; B60C 23/0488; B60C 11/24; B60C 23/007; B60C 23/062; B60C 23/0401; B60C 23/0413; B60C 23/06; B60C 23/043; B60C 23/02; B60C 23/0452; B60C 23/0498; B60C 23/0467; B60C 99/006; B60C 2019/004; B60C 23/0428; B60C 23/0442; B60C 11/243; B60C 23/009; B60C 23/0425; B60C 23/00354; B60C 23/004; B60C 23/045; B60C 23/0464; B60C 23/04985; B60C 23/00318; B60C 23/00; B60C 23/003; B60C 23/00372; B60C 23/0403; B60C 23/0406; B60C 23/0472; B60C 23/066; B60C 29/02; B60C 23/006; B60C 11/00; B60C 23/0454; B60C 23/044; B60C 23/0455; B60C 25/002; B60C 23/008; B60C 23/0483; B60C 23/0461; B60C 23/0474; B60C 23/0489; B60C 23/0415; B60C 23/0491; B60C 29/064; B60C 23/00363; B60C 23/0471; B60C 23/0459; B60C 23/0481; B60C 23/0476; B60C 11/0318; B60C 23/0477; B60C 2200/02; B60C 23/002; B60C 23/0437; B60C 2019/005; B60C 23/0405; B60C 23/042; B60C 23/0422; B60C 23/0423; B60C 23/0466; B60C 13/001; B60C 29/06; B60C 25/132; B60C 23/0427; B60C 23/0447; B60C 23/0449; B60C 9/18; B60C 25/00; B60C 23/065; B60C 23/0484; B60C 23/0486; B60C 19/003; B60C 23/00336; B60C 13/00; B60C 23/00345; B60C 23/08; B60C 17/00; B60C 2019/006; B60C 23/001; B60C 25/142; B60C 5/004; B60C 17/02; B60C 23/0445; B60C 23/0457; B60C 29/00; B60C 11/0083; B60C 25/145; B60C 9/02; B60C 11/0332; B60C 25/18; B60C 29/066; B60C 11/13; B60C 23/0418; B60C 23/0469; B60C 23/068; B60C 23/12; B60C 99/00; B60C 23/0432; B60C 25/138; B60C 5/14; B60C 11/03; B60C 23/005; B60C 25/005; B60C 25/007; B60C 25/0554; B60C 3/00; B60C 11/11; B60C 17/04; B60C 17/06; B60C 23/0435; B60C 23/063; B60C 23/10; B60C 25/14; B60C 29/005; B60C 29/062; B60C 99/003; B60C 11/032; B60C 11/12; B60C 13/003; B60C 15/06; B60C 19/001; B60C 23/126; B60C 23/127; B60C 23/16; B60C 29/068; B60C 3/04; B60C 9/20; B60C 11/01; B60C 11/0302; B60C 13/02; B60C 25/056; B60C 29/04; B60C 5/142; B60C 1/0016; B60C 11/0304; B60C 11/0306; B60C 19/08; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 11/02; B60C 17/0009; B60C 19/002; B60C 19/12; B60C 2019/007; B60C 2200/04; B60C 2200/06; B60C 23/00347; B60C 25/05; B60C 5/001; B60C 5/22; B60C 1/0008; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/12; B60C 9/005; B60C 9/1807; B60C 9/28; B60C 11/0041; B60C 11/04; B60C 2009/0276; B60C 2011/0033; B60C 2011/0346; B60C 2015/0617; B60C 2015/0678; B60C 2015/0682; B60C 2200/00; B60C 23/085; B60C 25/0548; B60C 25/185; B60C 7/105; B60C 7/107; B60C 9/22

USPC .................................. 73/700–756, 146–146.8

See application file for complete search history.

(56)  References Cited

U.S. PATENT DOCUMENTS

| | | | |
|---|---|---|---|
| D309,938 S | 8/1990 | Schoepe et al. | |
| 5,644,074 A | 7/1997 | Huang | |
| 5,939,627 A | 8/1999 | Huang | |
| D422,058 S | 3/2000 | Meredith | |
| D528,450 S | 9/2006 | Petrucelli | |
| D666,933 S | 9/2012 | Hoffman et al. | |
| 8,584,695 B2 | 11/2013 | Lau | |
| D728,743 S | 5/2015 | Giles | |
| 11,112,327 B2 | 9/2021 | Cegnar et al. | |
| D968,989 S * | 11/2022 | Cegnar | D23/233 |
| 2002/0126005 A1 | 9/2002 | Hardman et al. | |
| 2005/0204807 A1 | 9/2005 | Tseng | |
| 2005/0252284 A1 | 11/2005 | Wu | |
| 2006/0217618 A1 | 9/2006 | Lia et al. | |
| 2007/0068239 A1 | 3/2007 | Chen | |
| 2010/0139411 A1 | 6/2010 | Wu | |
| 2011/0140876 A1 | 6/2011 | Deniau | |
| 2015/0107367 A1 | 4/2015 | Kosberg et al. | |
| 2016/0187209 A1 | 6/2016 | Bao et al. | |

(56) References Cited

U.S. PATENT DOCUMENTS

| | | |
|---|---|---|
| 2017/0080761 A1 | 3/2017 | King et al. |
| 2017/0087944 A1 | 3/2017 | King et al. |
| 2017/0113498 A1 | 4/2017 | King et al. |
| 2019/0204175 A1 | 7/2019 | Cegnar et al. |
| 2023/0304592 A1* | 9/2023 | Huang ................... F16K 15/20 |

OTHER PUBLICATIONS

Cegnar, U.S. Appl. No. 63/152,455, filed Feb. 23, 2021, titled "Pressure Measurement Apparatus", 17 pages.

GeoBeats Science, "How To: Check Tire Pressure and Inflate Tires", You Tube, available online at https://www.youtube.com/watch?v=QTst6ZdlVtg, Jul. 15, 2011, 1 page.

Global Test Supply, "Weiss DUGY3-015-2L Solar-Powered Pressure Gauge, 15 psi, ½" NPT", available online at https://www.globaltestsupply.com/product/weiss-dugy3-015-21-light- powered-pressure-gauge, Jul. 23, 2021, 2 pages.

Halkey Roberts, "Fill and Deflate Boat Valve", available online at https://www.halkeyroberts.com/Products/Fill-and-deflate-boat-valve, 2020, 1 page.

KevCentral, "Bikemate Floor Pump with Gauge—Bicycle Tire Pump", You Tube, available online at https://www.youtube.com/watch?v=ggHtSIT0fMI, Jun. 5, 2017, 1 page.

Leafield Marine, "D7 Installation and Service Instructions", available online at https://www.leafieldmarine.co.uk/Portals/ 0/Documents/D7-Installation-and-Service-Instructions.pdf, Oct. 26, 2016, United Kingdom, 5 pages.

Maughan et al., U.S. Appl. No. 29/643,695, filed Apr. 11, 2018, titled "Attachable Inflatable Craft Pressure Gauge", 6 pages.

NRS, "K-Pump Kwik Check Standard Pressure Gauge", available online at https://www.nrs.com/product/80082.03/k-pump-kwik-check-standard-pressure-gauge, Mar. 1, 2021, 6 pages.

NRS, "NRS Mechanical Pressure Gauge", available online at https://www.nrs.com/product/17271/nrs-mechanical-pressure-gauge, Apr. 5, 2017, 2 pages.

NRS, "NRS Mechanical Pressure Gauge", available online at https://www.nrs.com/product/17271/nrs-mechanical-pressure-gauge, Jan. 23, 2021, 2 pages.

NRS, "Riken/Achilles Replacement Military Valve", available online at https://www.nrs.com/rikenachilles-replacement-military-valve/pcbn, Jan. 31, 2020, 1 page.

NRS, "Summit 2 Valve for AIRE Tributary", available online at https://www.nrs.com/summit-2-valve-for-aire-tributary/pxea, Jan. 31, 2020, 1 page.

RAVE Sports, "0-15 PSI Digital Pressure Gauge", available online at https://www.ravesports.com/products/0-15-psi-digital-pressure-gauge, Mar. 1, 2021, 2 pages.

River Gear, "Pressure Gauges bu Leafield for Rafts, Inflatable Boats, & SUP", available online at https://rivergear.com/product/raft-inflatable-boat-pressure-gauge-by-leafield/?doing_wp_cron=1627085999.5340259075164794921875, Mar. 1, 2021, 3 pages.

Wikipedia, "Pressure Measurement: Bourdon Gauge", available online at https://en.wikipedia.org/wiki/Pressure_measurement, Nov. 25, 2019, 16 pages.

Wikipedia, "Presta Valve", available online at https://en.wikipedia.org/wiki/Presta_valve, Jan. 4, 2020, 3 pages.

Wikipedia, "Schrader Valve", available online at https://en.wikipedia.org/wiki/Schrader_valve, Nov. 29, 2019, 4 pages.

Zarnik et al., "An LTCC-Based Capacitive Pressure Sensor with a Digital Output", Informacije MIDEM 40.1, available online at http://www.midem-drustvo.si/Journal%20papers/MIDEM_40(2010)1p74.pdf, 2010, pp. 74-81.

Zoro, "Weiss Digital Solar Powered Thermometer, −50 Degrees to 300 Degrees F", available online at https://www.zoro.com/weiss-digital-solar-powered-thermometer-50-degrees-to-300-degrees-f-dvu6/i/G1226443/, Jul. 23, 2021, 6 pages.

* cited by examiner

PRESSURIZED AIR APPARATUSES AND ASSOCIATED PROCESSING CIRCUITRY

RELATED PATENT DATA

This application claims priority to PCT/US2022/016849, which has an international filing date of Feb. 17, 2022, entitled "Pressurized Air Apparatuses and Associated Methods", which claims the benefit of U.S. Provisional Patent Application Ser. No. 63/152,455, filed Feb. 23, 2021, entitled "Pressure Measurement Apparatus", and the disclosures of which are incorporated herein by reference.

TECHNICAL FIELD

This disclosure relates to pressurized air apparatuses and associated methods.

BACKGROUND OF THE DISCLOSURE

The present disclosure relates to pressurized air apparatuses and associated methods for facilitating the determination of air pressures within a pressurized volume of air, such as an inflatable watercraft, tire, etc. As described herein, one embodiment of a pressurized air apparatus is configured to inflate or increase the air pressure within an associated pressurized volume of air and to communicate the pressure of the pressured air within the pressurized volume to an operator of the pressurized air apparatus. Another embodiment of a pressurized air apparatus is configured to interface with a pressurized volume of air and to communicate the pressure of the pressurized air within the pressurized volume to an operator of the pressurized air apparatus. According to some embodiments described herein, a plurality of outputs of a pressure sensor are processed and some outputs are disregarded and one of the outputs is selected and a corresponding value of the selected output is communicated to an operator of the pressurized air apparatus and is indicative of the measured air pressure. Other example aspects of pressurized air apparatuses and associated methods are described herein as is apparent from the following detailed description.

BRIEF DESCRIPTION OF THE DRAWINGS

Example embodiments of the disclosure are described below with reference to the following accompanying drawings.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

Figure 1:
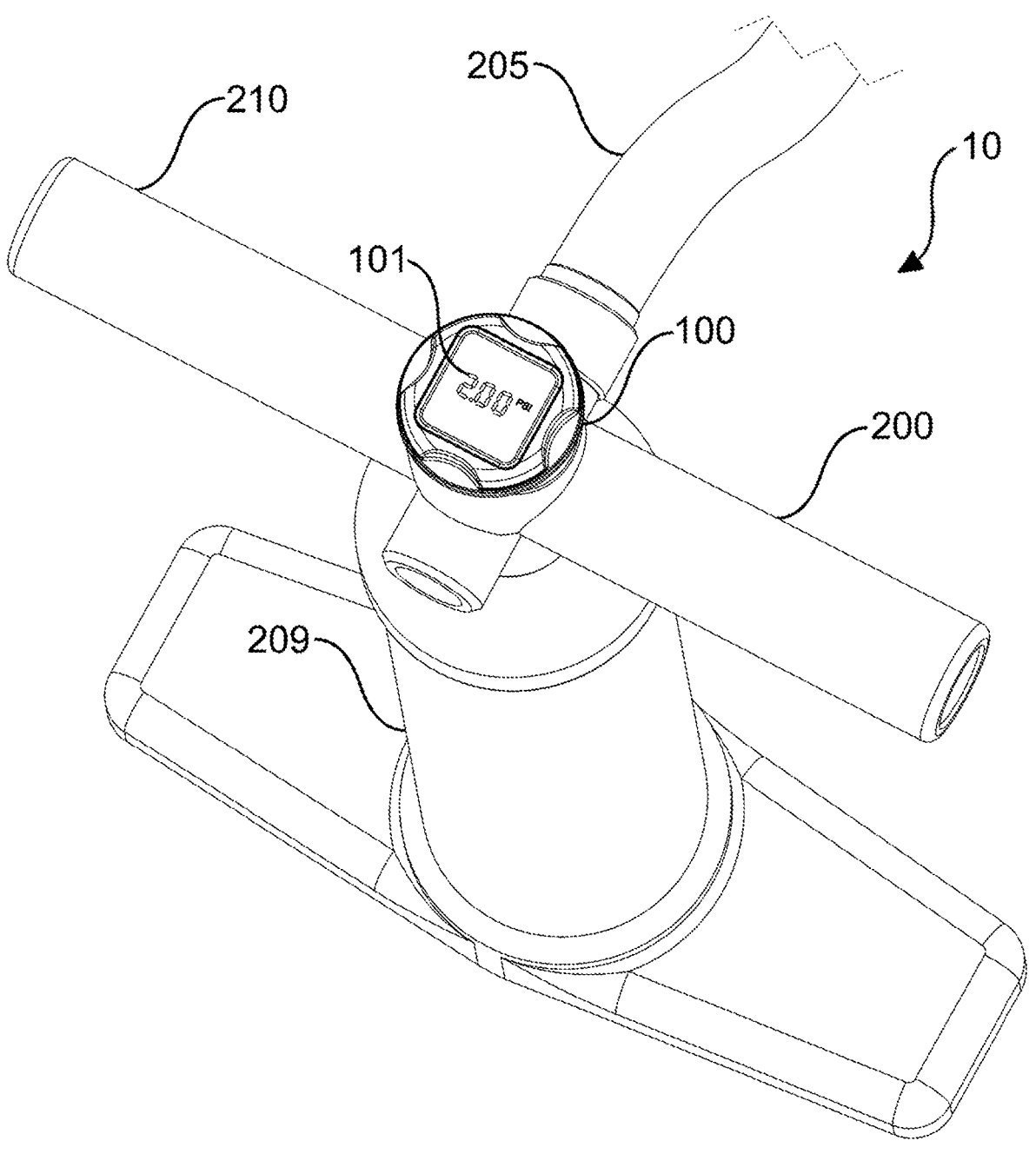
FIG. 1 is a perspective view of a pressurized air apparatus according to one embodiment.

Referring to FIG. 1, a pressurized air apparatus 10 is shown according to one embodiment. The depicted apparatus 10 includes a pressure gauge 100 integrated with a hand inflation pump 200 that is configured to increase the pressure within a pressurized volume of air. The depicted pump 200 includes a pump compression chamber 209, handle 210 and an outlet in the form of a connection hose 205 that is configured to be coupled with and provide pressurized air to an inflatable device or chamber (not shown in FIG. 1) during pump cycles where handle 210 is raised and lowered.

Pressure gauge 100 is configured to measure air pressure within connection hose 205 and communicate information regarding the measured air pressure to an operator of the apparatus 10. Pressure gauge 100 comprises a user interface in the form of a display 101 that is configured to visually depict measured air pressure for observation by an operator of apparatus 10 in the embodiment of FIG. 1 although the measured air may be communicated to the operator in other ways in other embodiments. In the illustrated embodiment, the gauge 100 is coupled with the handle 200 and display 101 is positioned to be observed by the operator of the apparatus 10. The illustrated pump is one possible pump implementation and other pump configurations are possible.

Figure 2:
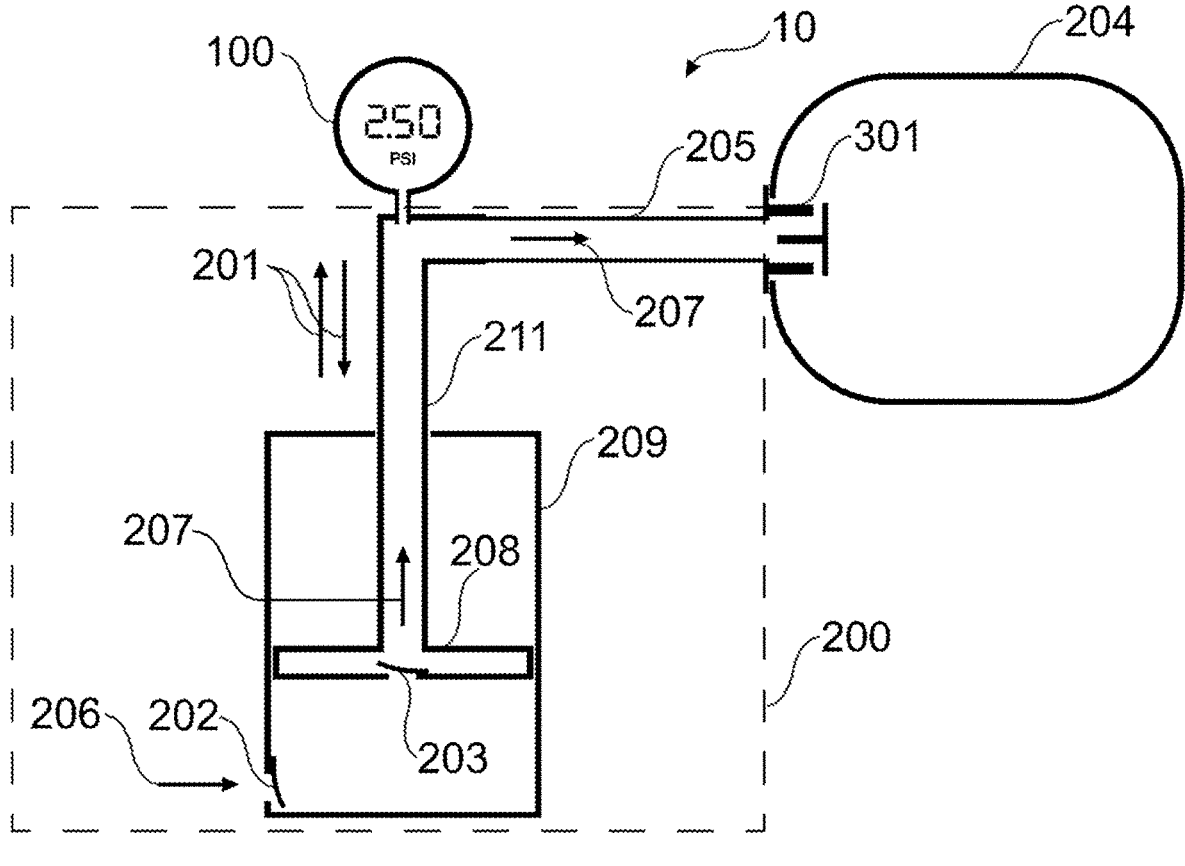
FIG. 2 is a functional diagram of the apparatus of FIG. 1.

Referring to FIG. 2, operation of pump 200 is described with respect to inflation of an inflatable air chamber of an inflatable device 204. Example inflatable devices 204 include watercraft, tires or tubes for tires in example embodiments and may include a valve 301 to maintain air pressure within the air chamber. The pump 200 has a piston 208 that is coupled with handle 210 of FIG. 1 and which moves in an up and down motion 201 in one or more pump cycles (each pump cycle including an upstroke and downstroke). Air pressure within connection hose 205 and inflatable device 204 is increased with each pump cycle. The pressure gauge 100 is enclosed in a housing which is made to attach to and form an airtight seal with pump 200 such as through threads shown in FIG. 4.

During an upstroke, air enters compression chamber 209 through an inlet valve 202 as represented by an air flow 206. During the downstroke, air is compressed in compression chamber 209 and travels through an outlet valve 203 into a hollow passage within a tube 211 that is coupled with the handle 210 of FIG. 1 and as shown by an air flow 207. The tube 211 is in fluid communication with connection hose 205 that supplies the air to inflate and increase the air pressure within the inflatable device 204. The inlet and outlet valves 202, 203 each take the form of a one-way valve and only let air pass through them in one direction as shown by air flows 206, 207 in the illustrated embodiment. Pressure gauge 100 is in fluid communication with the interior of tube 211 and connection hose 205 and is configured to measure the pressure of air within airflow 207 and communicate the measured pressure to an operator of apparatus 10.

Figure 3:
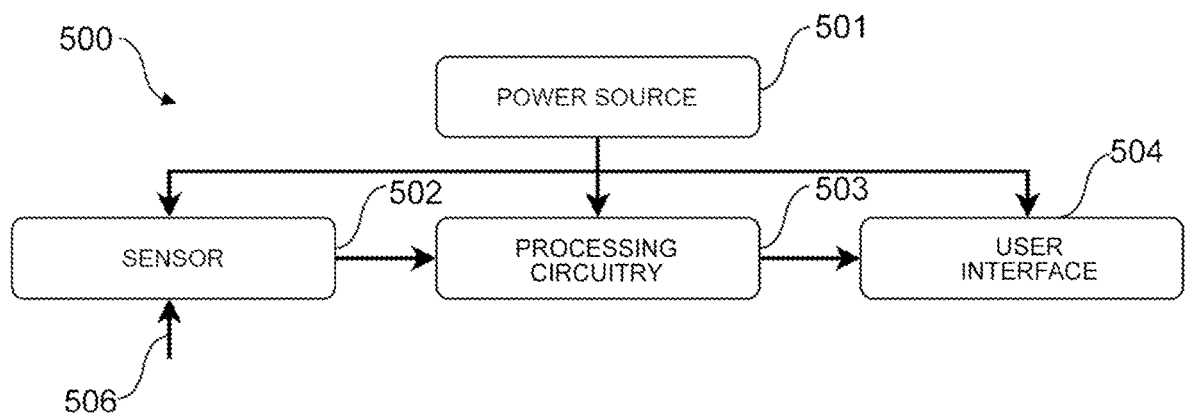
FIG. 3 is a block diagram of electrical components of a pressurized air apparatus according to one embodiment.

Referring to FIG. 3, a plurality of electrical components 500 of pressure gauge 100 are shown according to one embodiment. The depicted components include a power source 501, pressure sensor 502, processing circuitry 503 and user interface 504.

Power source 501 may be implemented in any suitable arrangement to provide operational electrical energy to the remaining components 500 of pressure gauge 100. In some examples, power source 501 includes a battery or solar panels.

Pressure sensor 502, such as a MEMS pressure sensor, is in fluid communication with an air input 506 that is in fluid communication with a pressurized volume of air and is configured to receive pressurized air therefrom. Sensor 502 is configured to measure different pressures of the air from the pressurized volume at a plurality of different moments in time, and to generate a plurality of outputs in the form of electrical signals that correspond to and are indicative of the measured air pressures. Outputs of the pressure sensor 502 may be analog voltage, resistive or digital signals. Example digital signals include, but are not limited to I2C, SPI, parallel, etc.

Processing circuitry 503 is arranged to process data including the outputted signals from pressure sensor 502, control data access and storage, and control other desired operations of pressure gauge 100. Example processing of the signals from the pressure sensor include disregarding some of the signals and selecting one of the signals and the respective measured pressure thereof for communication to the operator.

Processing circuitry 503 may be implemented as one or more processor(s) and/or other structure configured to execute executable instructions including, for example, software and/or firmware instructions. Other example embodiments of processing circuitry 503 include hardware logic, PGA, FPGA, ASIC, state machines, and/or other structures alone or in combination with one or more processor(s). These examples of processing circuitry 503 are for illustration and other configurations are possible. Processing circuitry 503 may also include storage circuitry configured to store programming such as executable code or instructions (e.g., software and/or firmware), electronic data, and outputs from sensor 502.

User interface 504 is configured to interact with a user including conveying data to an operator of the apparatus (e.g., visually conveying data including displaying data for observation by the operator, audibly communicating data to an operator, etc.). In one exemplary embodiment, the user interface 504 includes display 101 that is configured to depict visual information, such as values that are indicative of measured air pressures for observation by the operator of the apparatus 10. In some embodiments, processing circuitry 503 controls the user interface 504 to communicate a selected one of the measured pressures following measurement of the air pressures of the pressurized volume of air at plural moments in time, and breakage of an airtight seal between the pressure gauge 100 and the pressurized volume of air where the air pressure is being measured. This example operation permits the operator of the apparatus to move the apparatus and pressure gauge 100 into a convenient position for observation of a displayed pressure measurement following measurement of the air pressures.

Figure 4:
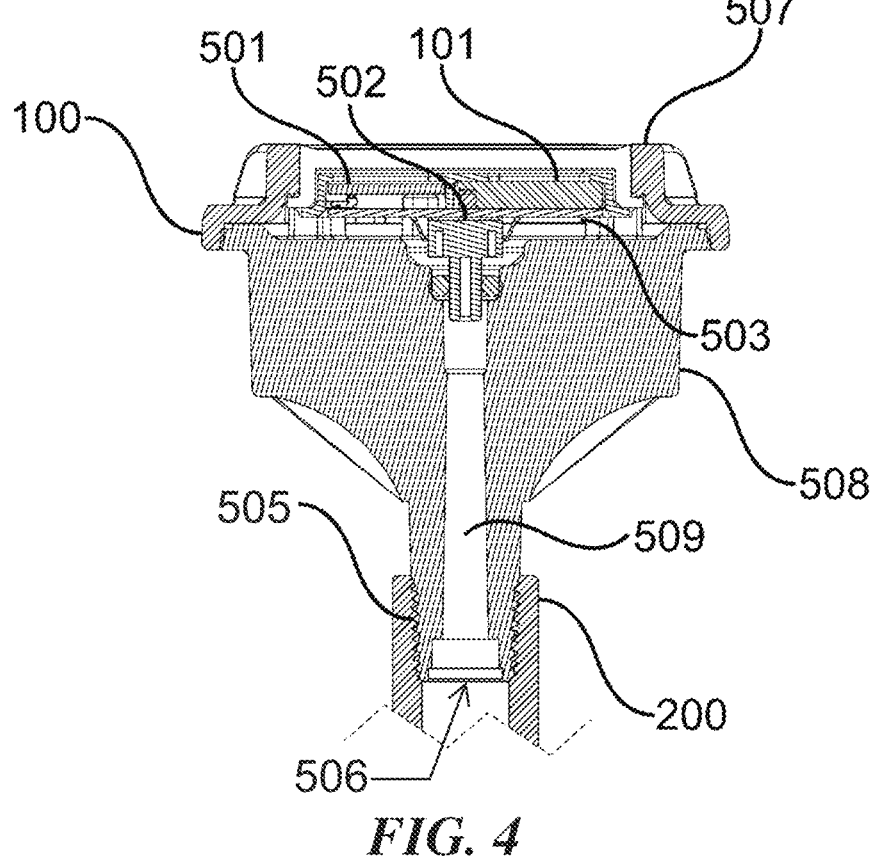
FIG. 4 is a cross-sectional view of a pressure gauge according to one embodiment.

Referring to FIG. 4, a cross-sectional view of a pressure gauge 100 is shown according to one embodiment. The illustrated gauge 100 may be used with the pump 200 of FIG. 1 in one implementation. The illustrated gauge 100 includes power source 501, pressure sensor 502, and processing circuitry 503 within upper and lower housings 507, 508. Lower housing 508 includes threads 505 that are configured to form an airtight seal with respect to pump 200. Lower housing 508 additionally includes an internal passageway 509 that operates as an air input 506 to communicate pressurized air from pump 200 to pressure sensor 502 enabling pressure sensor 502 to monitor air pressures within pump 200.

Figure 5:
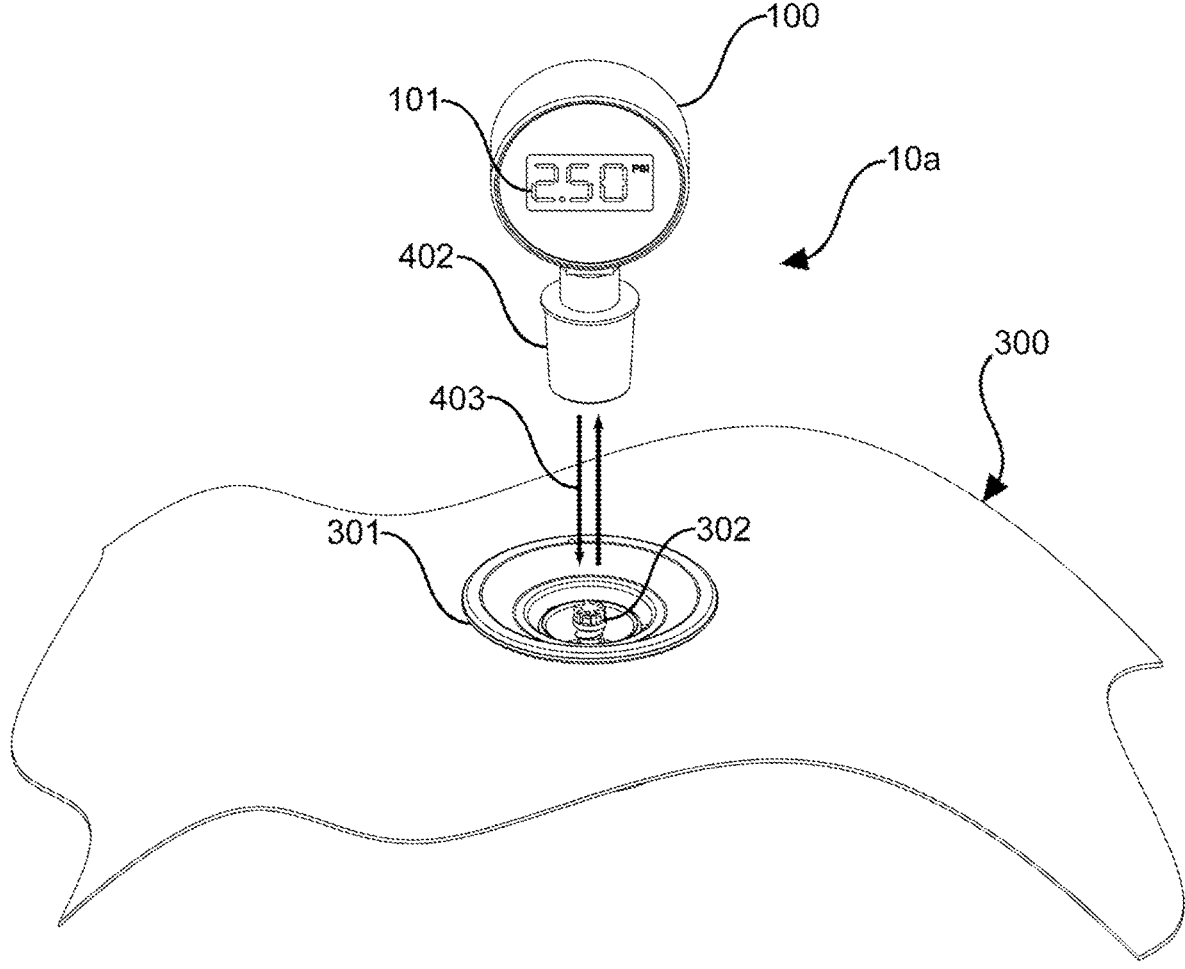
FIG. 5 is an illustrative view of a pressurized air apparatus and an inflatable watercraft according to one embodiment.

Referring to FIG. 5, a pressurized air apparatus 10a is shown according to a second embodiment. The illustrated apparatus 10a includes a pressure gauge 100 and an interface 402 configured to form an airtight seal with respect to a valve of an inflatable device 300, such as an inflatable watercraft. Inflatable watercraft are vessels which when inflated by air create a semi-ridged mechanical structure which is buoyant in water. Examples of such vessels are whitewater rafts, standup paddleboards (SUP) and rigid hull inflatable boats (RIB). Some inflatable watercraft are constructed of a flexible plastic material such as PVC (polyvinylchloride) or PU (polyurethane) and are inflated to an inflation pressure recommended by the manufacturer for optimal performance. To achieve safe and optimal performance it is important to inflate these craft to the correct inflation pressure and not significantly over the recommended inflation pressure. Example valves of watercraft include a Leafield valve, a Halkey Roberts valve, a Summit valve, a Boston valve, and a Military valve and different interfaces 402 may be used to form airtight seals with respect to the valves.

The apparatus 10a may be used as a hand-held device to spot check the air pressure of an internal pressurized volume of air of the inflatable device 300 having an associated valve. In some embodiments, the pressure gauge measures air pressures within the pressurized volume of the watercraft before, during and following the formation of an airtight seal between the pressure gauge 100 and the valve of the pressurized chamber of the watercraft.

An operator may implement an insertion/removal operation 403 of the apparatus 10a with respect to the inflatable device 300 wherein the interface 402 opens a valve poppet 302 within a valve port 301 upon insertion of the interface 402, and the valve poppet 302 returns to a sealed position upon removal of interface 402 to maintain an airtight seal to maintain the internal air pressure within the inflatable device 300. Valve-port 301 is affixed to and sealed against a wall of inflatable device 300 which may be made from a flexible material to define an internal inflatable chamber. During the action of insertion, a portion of the interface 402 depresses the valve poppet 302 open which allows for air pressure communication to the gauge through the interface 402 and air input 506. In this way, the pressure sensor of the gauge measures the air pressure inside of the pressurized volume of air of the inflatable chamber.

Figure 6:
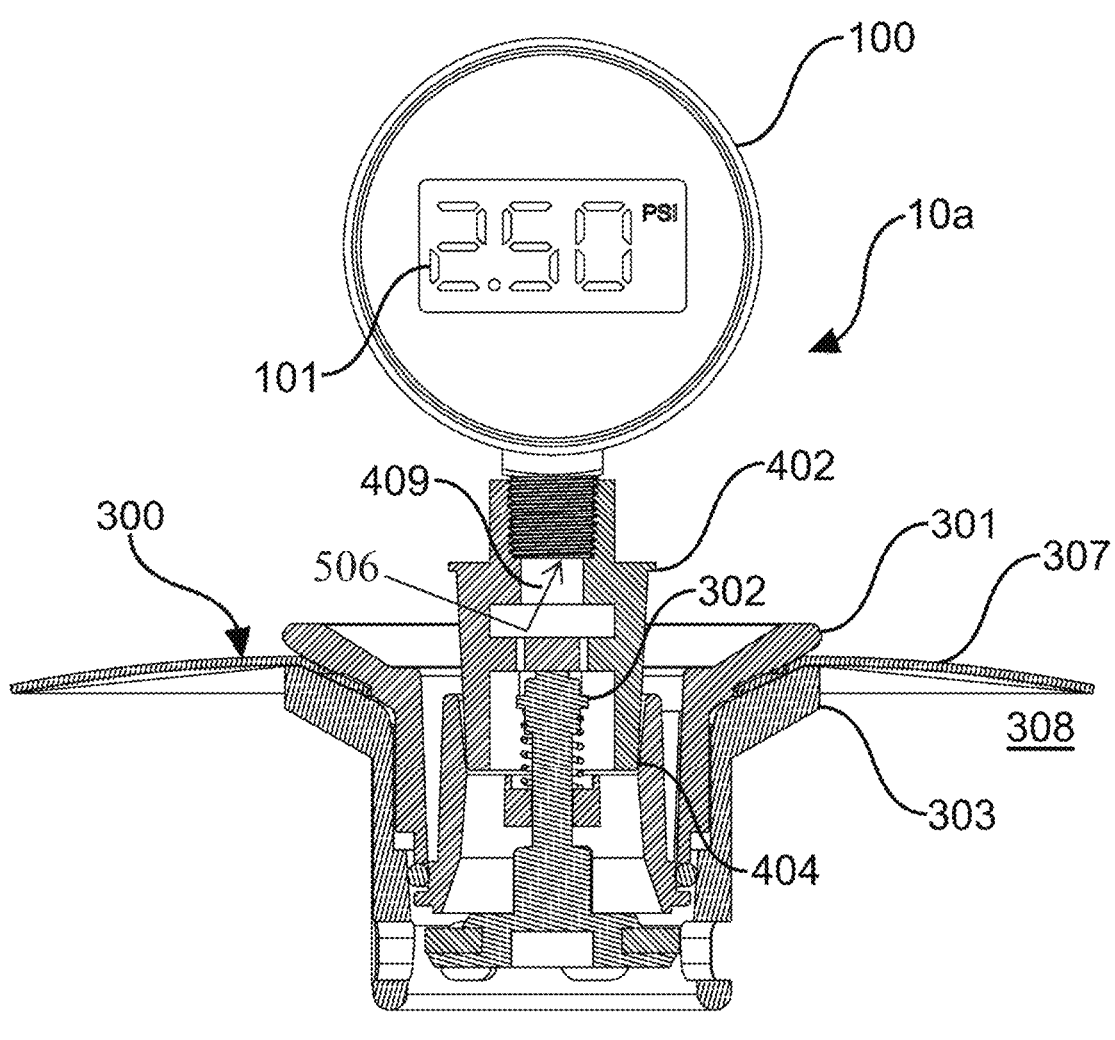
FIG. 6 is a cross-sectional view of the pressurized air apparatus and inflatable watercraft of FIG. 5.

Referring to FIG. 6, a wall 307 of inflatable device 300 is shown inserted between valve port 301 and a backing nut 303. In addition, apparatus 10a is shown in a position with interface 402 forming an airtight seal with internal member 404 of valve port 301 and where the poppet 302 is depressed by interface 402 upon insertion. Interface 402 includes an internal chamber 409 enabling passage of pressurized air within a pressurized volume 308 of air to the air input 506 and internal pressure sensor of pressure gauge 100. The measured air pressure of the pressurized volume 308 may be visually depicted on display 101 for observation by an operator. According to some embodiments, the measured air pressure may be the maximum air pressure that was measured during the entire insertion/removal operation 403 of a spot check. In addition, the measured pressure may be displayed following removal of the apparatus 10a from the inflatable device 300 to permit the operator to move the apparatus 10a into a position to easily view the measured air pressure that is depicted on display 101.

Figure 7:
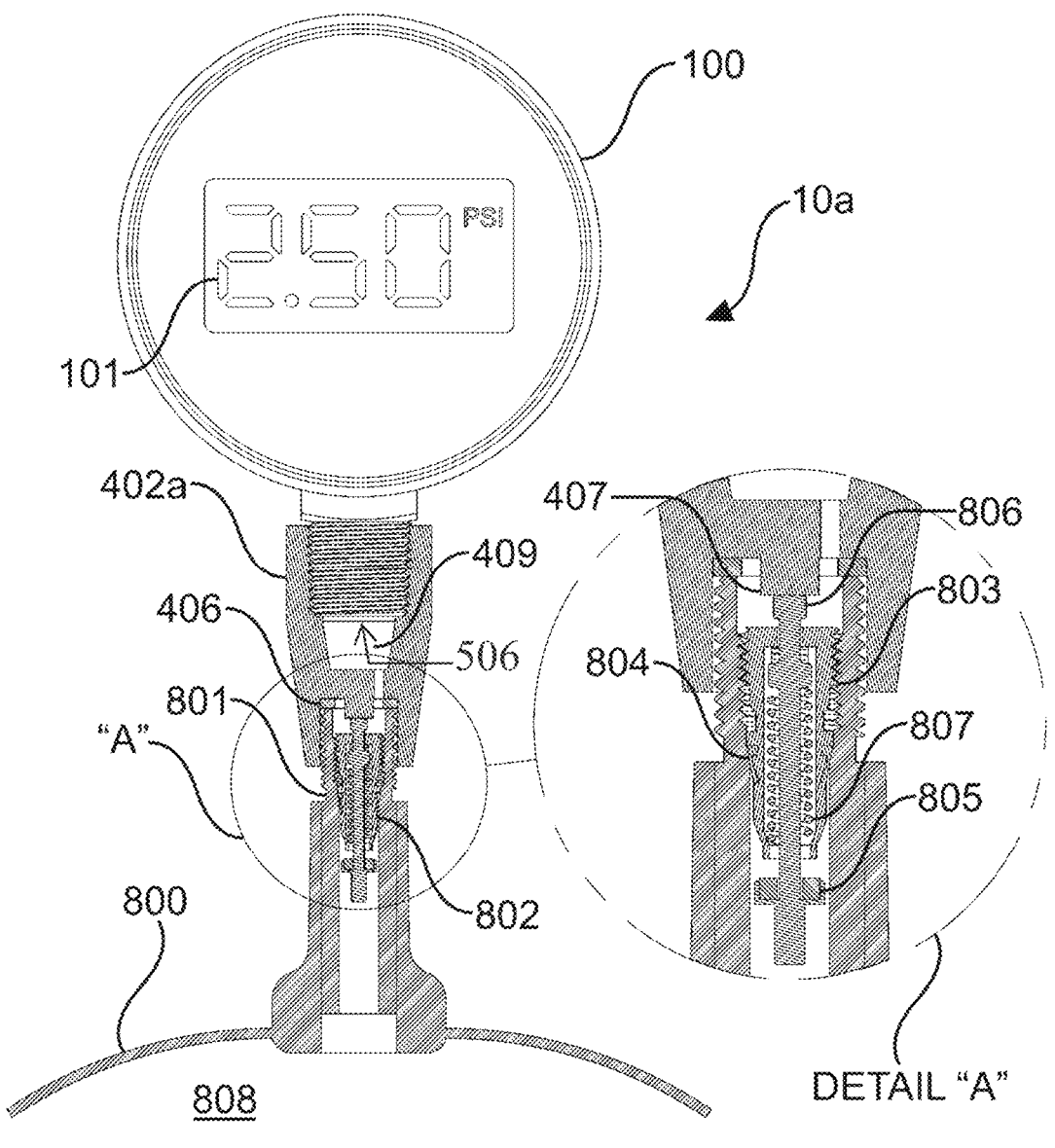
FIG. 7 is a cross-sectional view of a pressurized air apparatus and tire according to one embodiment.

Referring to FIG. 7, a pressurized air apparatus 10*a* is shown according to another hand-held embodiment which is useable by the operator to spot check the pressure of a pressurized volume 808 of air of an inflatable device 800, such as a tire or tube thereof. The valve stem shown in FIG. 7 is that of a Shrader valve that is used to seal air pressure inside of the pressurized volume 808. Other valves are possible including for example Presta valves.

The valve can be used to deflate an inflatable chamber of the device 800 by depressing the poppet 806 which will open the valve. The valve is composed of a valve stem 801 and valve stem core 802. The valve stem core 802 is composed of several parts. The core 802 screws in and attaches to the valve stem 801 via threads 803. When the core 802 is assembled onto the stem 801, it seals against the stem 801 by use of a valve stem core seal 804. Poppet 806 contains a poppet seal 805 which prevents air from escaping from the pressurized volume 808 of the inflatable chamber of the device 800. The poppet is held closed using a poppet spring 807 and further tends to seal closed from the force due to the internal inflation chamber pressure. The force on the poppet 806 from the poppet spring 807 and the force from the internal air pressure can be overcome by pressing on the poppet 806 which opens the valve and allows pressure to flow either in or out of the pressurized volume 808.

In the illustrated embodiment, the apparatus 10*a* comprises an interface 402*a* that is configured to form a momentary airtight seal with valve stem 801 during a spot-check of air pressure. The apparatus 10*a* is configured to spot-check the tire pressure where the interface 402*a* temporarily establishes an airtight seal with the valve stem 801. In the illustrated embodiment, interface 402*a* includes a nipple-to-stem seal 406 which forms the airtight seal against the valve stem 801. Interface 402 includes a valve stem poppet extension 407 which opens the valve stem poppet 806 and allows communication of pressurized air within chamber 808 to flow through chamber 409 and the air input 506 to the pressure sensor within pressure gauge 100 enabling apparatus 10*a* to measure the air pressure from the pressurized volume 808.

As described with respect to FIG. 6, the measured air pressure may be the maximum air pressure that was measured during the spot-check of the pressurized volume 808. In addition, the measured pressure may be displayed following removal of the apparatus 10*a* from the inflatable device 800 to permit the measured air pressure to be easily observed by the operator.

Figure 8:
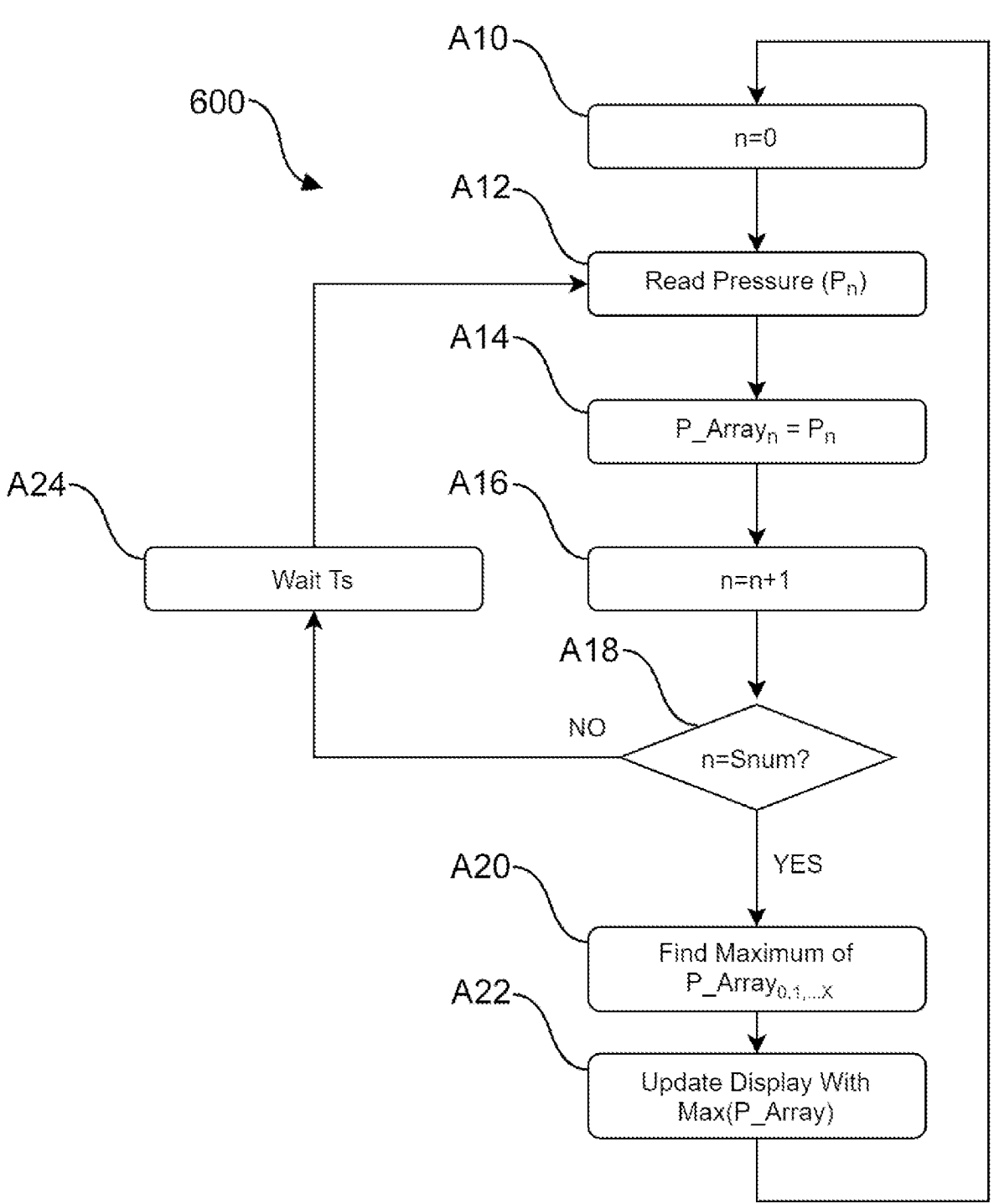
FIG. 8 is a flow chart of processing performed by a pressurized air apparatus according to one embodiment.

Referring to FIG. 8, a flow chart of a process 600 performed by pressurized air apparatuses are described according to an embodiment. The process 600 may be executed by processing circuitry described above and may include more, less and/or alternative acts in the other embodiments. The process 600 enables the pressurized air apparatuses to receive a dynamically changing input pressure and to depict a measured pressure in a form that is easy for a human operator to read.

At an act A10, a sample index (n) is initially set to 0. The sample index denotes the sample number in a series of samples occurring at different moments in time.

At acts A12 and A14, a sample of pressure (Pn) from the pressure sensor is read and stored in a first location of an array (P_Arrayn).

At an act A16, the sample index n is then incremented and compared at act A18 with Snum which is a pre-defined parameter which controls the number of samples to be stored in the array and analyzed.

If act A18 is negative, the process proceeds to act A24 and waits for a sample time set by TS so that samples can be spaced in time.

If act A18 is affirmative, the process proceeds to an act A20 where the array of pressure values (P_Array0 through P_ArraySnum) are analyzed in order to disregard some of the measured pressures and select one of the measured pressures. In one embodiment, the measured pressure that is selected is the maximum measured pressure in the array of pressure measurements.

Once the maximum value in the array is identified, it is depicted via the display at an act A22. The value on the display persists for an amount of time to enable the operator to move the apparatus to a position that may be easily observed. In one embodiment, the pressures of the pressurized volume in the array are measured over a period of time and the selected maximum value may be depicted on the display 101 for an amount of time after measurement of the pressures over the period of time to facilitate reading by an operator. In some embodiments, the maximum value of the measured air pressures is displayed after the air pressure of the pressurized volume falls below the maximum measured value.

Following the depiction of the measured pressure using the display, the process may be repeated starting with resetting the sample index n back to 0 at act A10.

Figure 9:
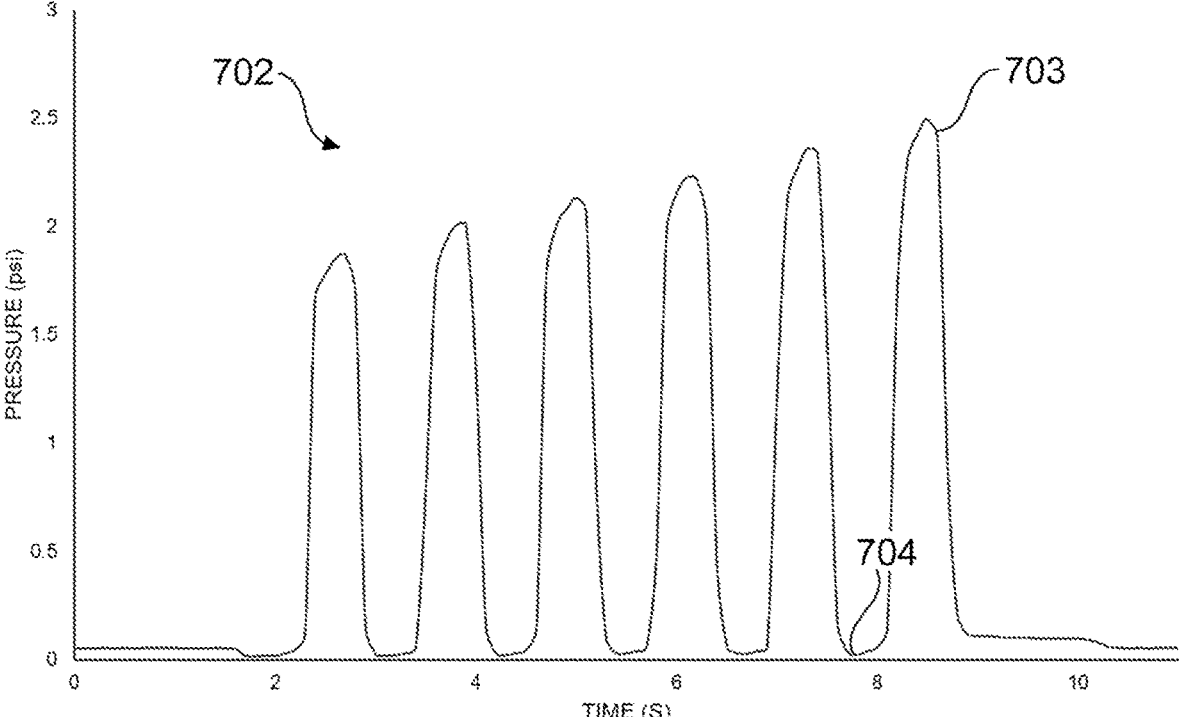
FIG. 9 is a graphical representation of air pressure over time during pumping and inflation of an inflatable device.

Referring to FIG. 9, a graph of measured air pressure 702 received at the pressure gauge implemented with a hand pump while pumping is shown. The pressure signal 702 is shown over a plurality of pump cycles each having a peak 703 and valley 704. While the pump is moving in the pumping direction in an exhaust stroke, a pressure is developed which is shown as a peak 703 in the pressure signal 702. While the pump is stopped at the extent of the stroke and when the pump is moving in the direction of an intake stroke, the measured pressure exhibits a valley 704. FIG. 9 also shows that the peaks of the air pressure are progressively increasing during pumping operation. This represents an increasing pressure inside the inflatable chamber (which is relatively small in this case) and is a result of air being pumped into the chamber by the hand pump.

In one embodiment, the processing circuitry discards unwanted low-pressure values, i.e., valleys 704 and selects the maximum pressures corresponding to the peaks 703 and then controls the display of the maximum pressure values which correctly represent the pressures in the inflatable chamber that increase over time during the pumping. The values are displayed for a period of time so that the values can be easily read. In one embodiment, each of the increasing maximum values of the peaks 703 is displayed until a subsequent greater air pressure of a subsequent peak 703 is measured whereupon the new maximum pressure is depicted. The air pressure of the last measured peak 703 may be displayed for a period of time to facilitate observation by an operator.

Figure 10:
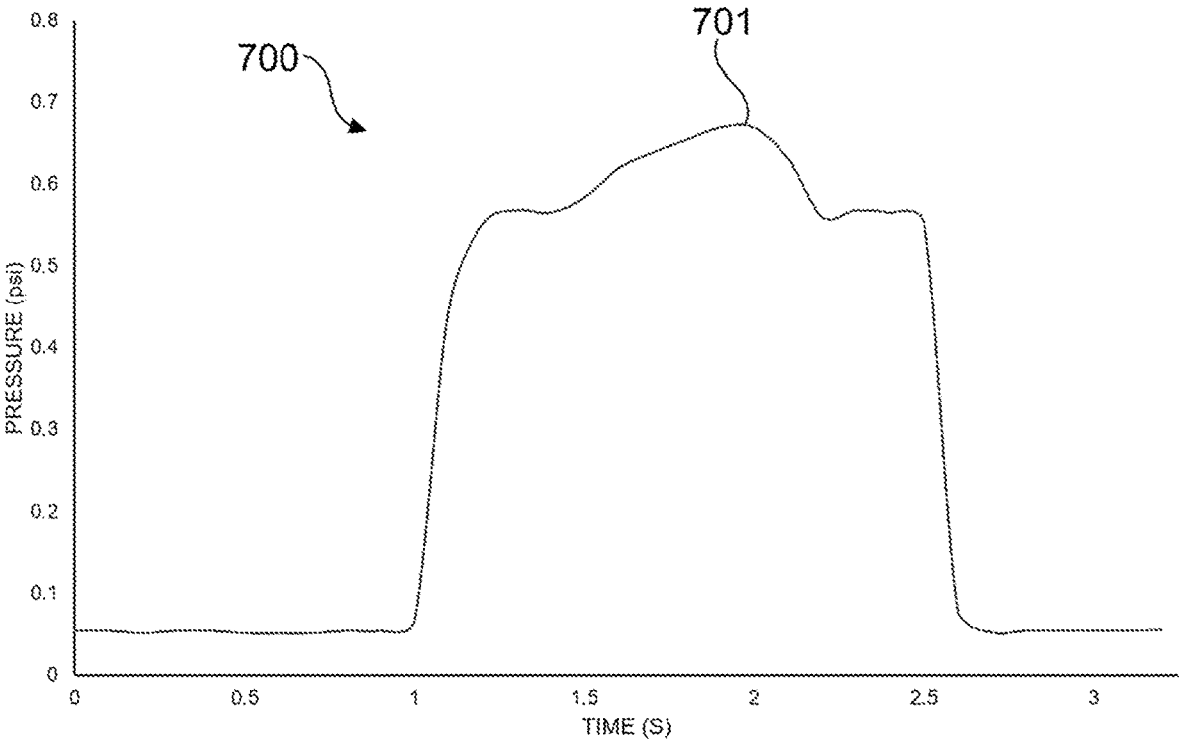
FIG. 10 is a graphical representation of air pressure over time during a spot-check of pressure of an inflatable device.

FIG. 10 shows a graph of air pressure 700 received and measured at the air input of a pressure gauge measuring the pressure within a pressurized volume of air of a watercraft, tire or tube. The illustrated graph results from spot-checking of the air pressure of the pressurized volume of air. For example, with respect to the embodiment shown in FIGS. 5 and 6, a portion of the interface of the pressurized air apparatus depresses a valve poppet open which allows for air pressure communication to the pressure sensor. During the process of insertion, it is common for some air to leak out and the pressure at the air input of the gauge itself is somewhat variable. This can happen while the interface depresses the valve-port poppet open but the interface has not yet formed an adequate airtight seal against the valve-port body resulting in measured pressure samples of varying amplitudes.

During the period of time that the interface is inserted and sealed, and the valve-port poppet is open, the gauge receives a peak signal corresponding to a maximum air pressure 701. This peak signal represents the actual pressure in the inflatable chamber. In one embodiment, the measurements or samples of the air pressure are analyzed by processing circuitry that selects a maximum air pressure 701 and the samples that are less than maximum 701 are disregarded.

Thereafter, the pressure gauge displays the selected maximum pressure 701 during and following measurement of the air pressures of graph of air pressures 700 to permit an operator to move the pressure gauge to a position for easy viewing of the displayed air pressure.

In some embodiments, the measured maximum air pressure may be compared to one or more thresholds and an alarm may be indicated if the maximum air pressure is less than a first threshold or greater than a second threshold indicating that the air pressure of the pressurized air chamber is too low or too high.

The pressurized air apparatuses discussed herein and that display measured air pressures for a period of time following measurement avoid difficulties with conventional gauges that provide instantaneous pressure measurements that have to be read while the gauge is inserted and perfectly sealed with respect to the inflatable chamber. It is often ergonomically challenging to apply the pressure gauge to the valve-port with a clear line of sight and in close enough proximity to the eye so that the gauge can be easily read. It is often the case that in order to read a gauge in this situation, the user must bend down close to the gauge to properly read it. And further, the awkward position required to read the gauge may make it progressively difficult to insert it into the valve-port properly. The combination of the need to perfectly align and insert the gauge with adequate force to form a good seal, and to find an easy-to-read line-of-sight position creates a situation which is unduly difficult for the user to execute and can lead to error.

In contrast, some of the embodiments discussed herein enable the apparatus to be inserted for a relatively short period of time, and the apparatus only has to be sealed well for a fraction of the insertion time. Then the apparatus may be removed and held up to a user's eyes for easily viewing of the measured pressure since some embodiments described herein display the maximum sampled pressure for a period of time after the apparatus has been removed from the inflatable chamber being measured.

In conventional pump embodiments, as a person pumps, the resulting fluctuating pressure is reflected on the attached pressure gauge which displays the instantaneous and fluctuating pressure. The reading displayed on the pressure gauge represents an instantaneous reading and therefore will be constantly changing and difficult to read. It is difficult if not virtually impossible to get any accurate sense of the pressure inside the inflation chamber in this configuration. When the person stops pumping, the one-way valve closes and the pressure on the pump side is reduced. While some pressure may remain on the pump side, the pressure will be dropping at some rate and therefore will be less than the pressure inside the chamber. These conventional gauges read and display the pump-side pressure and therefore not accurately represent the pressure inside the chamber being inflated. Some embodiments of the disclosure select the maximum sensed air pressure for display and observation by the user and corresponding to the accurate air pressure of the inflatable chamber.

According to some of the example embodiments discussed herein, values of measured air pressure are easier to read by an operator because the processing circuitry discards incorrect pressure values that are derived from the cyclical nature of the pumping or during leakage, and the display pressure value is static for a period of time dramatically improving the ability for a user to accurately read the pressure while pumping or spot-checking air pressure.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A pressurized air apparatus comprising:
an air input configured to receive pressurized air from a pressurized volume of air;
a pressure sensor in fluid communication with the air input, and wherein the pressure sensor is configured to:
receive the pressurized air from the air input;
measure a plurality of different pressures of the pressurized air at a plurality of moments in time; and
generate a plurality of signals that are indicative of the different pressures of the pressurized air measured by the pressure sensor at the plurality of moments in time;
processing circuitry coupled with the pressure sensor, and wherein the processing circuitry is configured to:
receive the plurality of signals from the pressure sensor; and
process the signals to select one of the signals and disregard others of the signals; and
a user interface coupled with the processing circuitry, and wherein the user interface is configured to communicate a value indicative of the pressure of the pressurized air that corresponds to the selected one of the signals to an operator of the pressurized air apparatus.

2. The apparatus of claim 1 wherein the processing circuitry is configured to select the one of the signals as a result of the selected one of the signals corresponding to a maximum of the measured pressures of the pressurized air compared with other ones of the measured pressures of the pressurized air of the others of the signals.

3. The apparatus of claim 1 wherein at least a substantially airtight seal is formed between the air input and the pressurized volume of air, and wherein the pressure sensor is configured to measure the different pressures of the pressurized air prior to and after the formation of the at least substantially airtight seal.

4. The apparatus of claim 3 wherein at least one of the moments in time occurs after breakage of the at least substantially airtight seal.

5. The apparatus of claim 4 wherein the pressurized air apparatus is a hand held apparatus, and the operator forms and breaks the at least substantially airtight seal.

6. The apparatus of claim 1 wherein at least a substantially airtight seal is formed with respect to the pressurized volume of air, wherein the at least substantially airtight seal is temporary, and wherein the user interface is configured to communicate the value of the pressure of the pressurized air to the operator after breakage of the at least substantially airtight seal.

7. The apparatus of claim 1 further comprising an interface comprising the air input and configured to form at least a substantially airtight seal with a valve of the pressurized volume of air.

8. The apparatus of claim 7 wherein the interface is configured to open the valve during the interfacing of the air input with the valve.

9. The apparatus of claim 1 further comprising a pump configured to increase pressure of the pressurized air, and wherein the pump comprises an outlet configured to output the pressurized air to an air chamber of an inflatable device and the air input.

10. The apparatus of claim 9 wherein the pump comprises a handle used by the operator of the pressurized air apparatus to increase the pressure of the pressurized air, and wherein the user interface is coupled with the handle in a position to be observed by the operator.

11. The apparatus of claim 9 wherein the pump is configured to increase the pressure of the pressurized air over a plurality of pump cycles, the pressure of the pressurized air increases during the pump cycles, and the processing circuitry is configured to select the one of the signals corresponding to a maximum pressure of the pressurized air and to disregard the others of the signals as a result of the others of the signals corresponding to pressures of the pressurized air that are less than the maximum pressure.

12. The apparatus of claim 9 wherein the pump is configured to increase the pressure of the pressurized air over a plurality of pump cycles, the pressure of the pressurized air increases and decreases during each of the pump cycles, and the processing circuitry is configured to select the one of the signals as a result of the one selected signal corresponding to a maximum pressure of the pressurized air during one of the pump cycles.

13. The apparatus of claim 9 wherein the pump is configured to increase the pressure of the pressurized air over a plurality of pump cycles, the pressure of the pressurized air increases and decreases during each of the pump cycles, and the processing circuitry is configured to select the one of the signals and plurality of additional signals as a result of the one signal and the additional signals corresponding to a plurality of maximum pressures of the pressurized air during respective ones of the pump cycles, and the user interface is configured to communicate a plurality of additional values to the operator that correspond to the additional signals.

14. The apparatus of claim 1 wherein the user interface comprises a display configured to visually convey the value to the operator of the pressurized air apparatus.

15. The apparatus of claim 1 wherein the plurality of moments in time are moments of time over a period of time, and wherein the user interface is configured to communicate the value of the pressure of the pressurized air to the operator after the period of time.

16. The apparatus of claim 1 wherein the pressure of the pressurized air rises to a maximum and thereafter decreases, and the user interface is configured to communicate the value of the maximum during the decreasing of the pressure of the pressurized air.

17. The apparatus of claim 1 wherein the pressure of the pressurized air rises to a maximum and thereafter decreases during each of a plurality of cycles, and the user interface is configured to communicate the value and a plurality of additional values that are indicative of the maximums of the pressure of the pressurized air for respective ones of the cycles.

18. The apparatus of claim 1 wherein the signals individually comprise data that is indicative of the pressure of the pressurized air at one of the moments in time, and the processing circuitry is configured to process the data of the signals to select the one of the signals and disregard the others of the signals.

19. The apparatus of claim 1 wherein the signals individually comprise data that is indicative of the pressure of the pressurized air at one of the moments in time, and the processing circuitry is configured to compare the pressures of the pressurized air of the signals to select the one of the signals and disregard the others of the signals.

20. The apparatus of claim 19 wherein the processing circuitry is configured to select the one of the signals and disregard the others of the signals as a result of the data of the one of the signals indicating a pressure of the pressurized air that is greater than the pressures of the pressurized air indicated by the data of the others of the signals.

21. The apparatus of claim 1 further comprising a housing coupled with the pressure sensor and the processing circuitry.

22. The apparatus of claim 1 wherein the value is an initial value, and the user interface is configured to communicate another value indicative of the pressure of the pressurized air after the communication of the initial value as a result of the another value indicating an increased pressure of the pressurized air compared with the pressure of the pressurized air indicated by the initial value.

* * * * *